United States Patent
Daum et al.

[15] 3,645,715
[45] Feb. 29, 1972

[54] ALGICIDAL AGENTS

[72] Inventors: Werner Daum, Krefeld-Bockum; Wilfried Paulus; Otto Pauli, both of Krefeld, all of Germany

[73] Assignee: Farbenfabriken Bayer Aktiengesellschaft, Leverkusen, Germany

[22] Filed: Dec. 11, 1968

[21] Appl. No.: 783,134

[30] Foreign Application Priority Data

Dec. 27, 1967 Germany.....................P 16 43 384.4

[52] U.S. Cl. ............................................................71/67
[51] Int. Cl. ...........................................A01n 9/00, A01n 23/00
[58] Field of Search ...............................71/67, 121; 424/330

[56] References Cited

UNITED STATES PATENTS

| 2,829,164 | 4/1958 | Rocklin | 260/570.5 |
| 3,125,486 | 3/1964 | Schmitz et al. | 71/67 |
| 3,142,615 | 7/1964 | Wehner | 71/67 |
| 3,247,053 | 4/1966 | Hodge | 71/67 |
| 3,394,137 | 7/1968 | Morris | 71/67 X |
| 3,466,162 | 9/1969 | Gloor et al. | 71/67 |

Primary Examiner—James O. Thomas, Jr.
Attorney—Burgess, Dinklage & Sprung

[57] ABSTRACT

Algicidal compositions of, and methods of combating algae including slime bacteria, using certain N-chlorophenyl-alkylene polyamines and their corresponding water soluble salts, some of which are known, which possess algicidal and slime bactericidal properties and which may be produced by conventional methods.

11 Claims, No Drawings

ALGICIDAL AGENTS

The present invention relates to and has for its objects the provision for algicidal compositions of N-chlorophenyl-alkylene polyamines and their corresponding water soluble salts, some of which are known, and which possess algicidal, including slime bactericidal, properties, in the form of mixtures of such compounds with solid dispersible carrier vehicles and/or with liquid dispersible carrier vehicles containing a surface-active agent, and methods for using such compounds in a new way especially for combating algae and slime bacteria, with other and further objects becoming apparent from a study of the within specification and accompanying examples.

It has been found in accordance with the present invention that certain N-chlorophenyl-alkylene polyamines, some of which are known, of the formula $$Z-(NH-A)_m-N{\overset{R^1}{\underset{R^2}{\diagdown}}} \quad (Ia)$$

in which m is a whole number from 1 to 4,

A is alkylene having two to 10 carbon atoms, $R^1$ is hydrogen, $R^2$ is hydrogen, —CHO, —CONH$_2$, lower alkanoyl, chloro lower alkanoyl, carboxyl-lower alkanoyl, or alkali metal carboxyl salt-lower alkanoyl, formamidino $$\left( -C{\overset{NH}{\underset{NH_2}{\diagup\diagdown}}} \right),$$

lower alkyl substituted formamidino, imidazoline or tetrahydropyrimidine with the proviso that $R^1$ and $R^2$ when taken together with the adjacent N-atom form piperrazino, and Z is a phenyl radical of the formula $$\underset{(X)_n}{\bigcirc}- \quad (i)$$

in which

X is hydrogen, chloro or lower alkyl, and 5, n is a whole number from 2 to 5, at least two of the substituents X being chlorine;

and the corresponding water-soluble salts thereof, exhibit strong algicidal, including slime bactericidal, properties.

It is very surprising that such N-chlorophenyl-alkylene polyamines and their corresponding water-soluble salts which are usable according to the present invention have a considerably effective algicidal activity and slime bactericidal activity while concomitantly having a much lower toxicity than other algicides known from the prior art, such as sodium pentachlorophenolate and organic mercury compounds. The algicidal compositions and methods of combating algae and/or slime bacteria using such active compounds according to the present invention therefore represent a valuable enrichment of the art.

The preferred compounds are those in which, in formula (Ia), Z is a phenyl radical per-substituted in the above sense, the group —(NH—A)$_m$ contains up to three nitrogen atoms and up to six carbon atoms, and $R^1$ is hydrogen and $R^2$ is hydrogen, or imidazoline or $R^1$ and $R^2$ together with the adjacent nitrogen atom is a piperazine ring system: and the corresponding water soluble salts thereof.

The present invention also provides certain new N-chlorophenyl-alkylene polyamines of formula (Ia) and their corresponding water soluble salts, i.e., those preferred compounds in which Z is a di- or tri-chlorinated phenyl radical, and the group —(NH—A)$_m$ as well as $R^1$ and $R^2$ possess the immediately aforesaid meaning, are new.

The instant new compounds may be prepared in the same manner as the known compounds, i.e., by known methods, as may be seen for example from U.S. Pat. No. 2,829,164 or German Auslegeschrift No. 1,136,060.

The method is illustrated by the following typical example:

$$\underset{Cl}{\overset{Cl}{\underset{|}{\bigcirc}}}-Cl + H_2N-C_6H_{12}-NH_2 \xrightarrow{excess}$$

$$\underset{Cl}{\overset{Cl}{\underset{|}{\bigcirc}}}-NH-C_6H_{12}-NH_2 \quad (I_1)$$

Advantageously, in accordance with the present invention, in the various formulas herein:

m is a whole number from 1–4, especially 1–3;

A represents alkylene having 2–10 carbon atoms, including straight and branched chains such as di-, tri-, tetra-, penta-, hexa-, hepta-, octa-, nona- and deca-methylene, especially $C_{2-6}$, or $C_{2-4}$, or $C_{2-3}$ alkylene; more especially ethylene (—CH$_2$—CH$_2$—); propylene-1,3 (—CH$_2$—CH$_2$—CH$_2$—); propylene-1,2 (—CH$_2$—CH[CH$_3$]—); butylene- -1,4, -1,3 and -1,2; pentylene- -1,5, -1,4 -1,3 and -1,2; hexylene- -1,6, -1,5,-1,4, -1,3, -1,2; 2,2-dimethyl-butylene-1,4; 1,2,3-tri-methyl-propylene-1,3; and the like; and particularly dimethylene or ethylene-1,2; methyl-dimethylene or propylene-1,2; tetramethylene or butylene-1,4 and hexamethylene or hexylene-1,6;

$R^1$ represents hydrogen;

$R^2$ represents hydrogen;

—CHO, i.e., formyl;

—CONH$_2$, i.e., aminocarbonyl;

lower alkanoyl, especially $C_{2-4}$ alkanoyl such as acetyl, propionyl, butyryl, and the like, i.e., $C_{1-3}$ or $C_{1-2}$ -alkyl-carbonyl or $C_{1-3}$ or $C_{1-2}$ alkyl-CO;

such lower alkanoyl, as defined above, which is substituted with a chloro, carboxyl or alkali metal salt of carboxyl, including chloro lower alkanoyl, especially chloro-substituted $C_{2-4}$ alkanoyl such as chloro acetyl; α- and β-chloro propionyl; α-, β- and γ-chloro butyryl; and the like; i.e., chloro-substituted $C_{1-3}$ or $C_{1-2}$-alkyl-carbonyl; and more especially chloro acetyl;

carboxyl (i.e., —COOH) lower alkanoyl, especially carboxyl-substituted $C_{2-4}$ alkanoyl such as carboxyl acetyl or malon-mono-yl (HOOC—CH$_2$—CO—), β-carboxyl-propionyl or succin-mono-yl (HOOC—CH$_2$—CH$_2$—CO—); γ-carboxyl-butyryl or glutar-mono-yl (HOOC—CH$_2$—CH$_2$—CH$_2$—CO—); and the like; i.e., carboxyl-substituted $C_{1-3}$ or $C_{1-2}$-alkylcarbonyl; and more especially β-carboxyl-propionyl; and alkali metal salt of carboxyl (i.e.,—COO–alkali metal) lower alkanoyl, especially alkali metal (e.g., Na, K, Li, and the like) salt of carboxyl-substituted $C_{2-4}$ alkanoyl such as the monosodium and monopotassium salts of carboxyl acetyl or malon-mono-yl (Na–and K- — OOC—CH$_2$—CO—); the monosodium and monopotassium salts of γ-carboxyl-butyryl or glutar-mono-yl (Na– and K- —OOC—CH$_2$—CH$_2$—CH$_2$—CO —); and the like; i.e., monalkali metal salts of carboxyl-substituted $C_{1-3}$ or $C_{1-2}$ -alkyl carbonyl; and more especially monosodium succinate-mono-yl;

$$\text{formamidino, i.e.} -C{\overset{NH}{\underset{NH_2}{\diagup\diagdown}}}$$

lower alkyl substituted formamidino, such as methyl, ethyl, n- and iso-propyl, n-, iso-, sec- and tert.-butyl substituted formamidino and when two alkyl groups taken together with the N-atoms of the formamidino group form an imidazolino or tetrahydro-pyrimidino nucleus, more especially an imidazolino nucleus, i.e.,

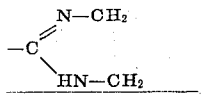

with the proviso that $R^1$ and $R^2$ when taken together with the adjacent nitrogen atom form piperazino (i.e., in the latter case $R^1$ and $R^2$ together forming the 3-aza-1,5-pentylene bridge);

Z represents an at least dichloro-substituted phenyl radical of the formula

in which
X represents
hydrogen;
chloro; and/or
lower alkyl such as methyl, ethyl, n- and iso-propyl, n-, iso-, sec.- and tert.-butyl, and the like, especially $C_{1-4}$ or $C_{1-3}$ or $C_{1-2}$ alkyl, and particularly methyl; and
$n$ is a whole number from 2–5 such that at least two of the substituents X are chloro;
Z including in particular all di-, tri- and tetra-chlorophenyl as well as pentachlorophenyl; all dichloro-mono to tri - methyl, ethyl, n- and iso-propyl, n-, iso-, sec.- and tert.-butyl, and the like, -phenyl; all trichloro-mono to di-methyl, ethyl, n- and iso-propyl, n-, iso-, sec.- and tert.-butyl, and the like, -phenyl; all tetrachloro-mono -methyl, ethyl, n- and iso-propyl, n-, iso-, sec.- and tert.-butyl, and the like, -phenyl; and especially di, tri, tetra and penta - chlorophenyl, and di to tetra-chloro- -mono to tri $C_{1-4}$ or $C_{1-3}$ or $C_{1-2}$ or $C_1$-alkyl- -phenyl;

Besides of water-soluble metal salts of carboxyl $C_2$–$C_4$ alkanoyl substituted compounds such compounds also contemplating the corresponding water-soluble ammonium salts thereof, e.g., with hydrogen halides (HCl, HBr, HF and HI); sulfuric acids including lower alkyl, especially $C_{1-4}$ alkyl, substituted sulfuric acids; lower alkanoic acids including acetic, propionic, butyric, and the like, acids, especially $C_{2-4}$ alkanoic acids; benzoic and salicylic acids, and the like; i.e., the corresponding hydrochlorides, hydrobromides, hydrofluorides, hydroiodides, hydrogen sulfates, lower alkyl-sulfates, lower alkanoates, e.g., acetates, propionates, butyrates, and benzoates, salicylates, etc., and the like, all of which are water soluble.

Preferably, the N-chlorophenyl-alkylene polyamines have the formula

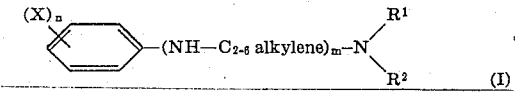

in which $m$ is a whole number from 1–3; $R^1$ and $R^2$ are hydrogen or $R^1$ represents hydrogen and $R^2$ represents formamidino, lower alkyl formamindino and when two alkyl groups taken together with the N-atoms of the formamidino group form an imidazolino or a tetrahydro-pyrimidino nucleus and with the proviso that $R^1$ and $R^2$ when taken together with the adjacent N-atom form a piperazino nucleus. X is hydrogen, chloro and/or lower alkyl; and $n$ is a whole number from 2–5, at least two of the substituents X being chloro.

As aforesaid, the new compounds are those in which $m$ is 1–3, the group —(NH—A)$_m$ contains 1–3 N-atoms and 2–6 carbon atoms, $R^1$ and $R^2$ are hydrogen or together form a piperazino group and Z is dichloro-phenyl and trichlorophenyl.

Suitable halogen compounds usable for the production process are, for example:
hexachlorobenzene, 1,2,3- and 1,2,4-trichloro-benzene, 2,3,5,6-tetrachloro-xylene-1,4, 2,4,5,6-tetrachloro-xylene-1,3, 3,4,5,6-tetrachloro-xylene-1,2, pentachloro-ethylbenzene, and the like.

Suitable amines are for example:
ethylenediamine, propylene-1,3-diamine, propylene-1,2-diamine, tetramethylenediamine, hexamethylenediamine, diethylenetriamine, triethylenetetramine, tetraethylenepentamine, dipropylene-1,2-triamine, dihexylene-1,6-triamine and β-aminoethyl-piperazine.

In general, at least 2 mols, preferably approximately 10 to about 20 mols, of amine is used per mol of halogen compound. If desired, the reaction may be carried out in the presence of a high-boiling, inert organic solvent, for example diphenyl ether. Preferably, however, excess amine is used as solvent. The reaction is, in general, carried out in the temperature range of about 50° to 250° C. When a halogen compound with aromatically attached halogen is used, the work is carried out especially at higher temperatures up to 250° C. In the case of the hexa- and penta-halogenobenzenes, the temperature range of 110° to 130° C. is preferred, but in the case of the tetra- and tri-halogenobenzenes the temperature range of 180° to 220° C. is preferred. The working up of the mixtures takes place in known manner, the halogen hydride liberated in the reaction being preferably bound (before removal of the whole of the excess amine) by addition of an inorganic base, preferably in aqueous form (for example NaOH, KOH, Ca(OH)$_2$, Na$_2$CO$_3$, and the like). After removal of the excess amine, the amino compound formed is isolated, optionally after further reaction with an acid anhydride or acid halide of a lower aliphatic carboxylic acid or urea or s-lower alkyl thiourea salts or with formic acid.

As noted above, the N-chlorophenyl-alkylene polyamines of formula (Ia) and their corresponding salts usable according to the present invention are distinguished from other known algicides by their particularly low toxicity. The use of the instant compounds, therefore, presents no difficulties, in contrast to customary agents such as sodium pentachlorophenolate or organic mercury compounds which are highly toxic.

The algicidal agents of the present invention are suitable for the control of the most diverse algae, for example for the control of Chlorophycae, Phaeophyceae, Cyanophyceae, Diatomeae, and the like. The amounts required can be readily ascertained by preliminary experiments; in general, concentrations of 1–15 mg./l. of algae-containing water prove sufficient.

The active compounds according to the instant invention can be utilized, if desired, in the form of the usual formulations or compositions with conventional inert pesticidal diluents or extenders, i.e., conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal inert dispersible liquid diluent carriers and/or inert dispersible solid carriers optionally with the use of carrier vehicle assistants, e.g., conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: dispersible liquid diluent carriers, including inert organic solvents, such as aromatic hydrocarbons (e.g., benzene, toluene, xylene, etc.), halogenated, especially chlorinated, aromatic hydrocarbons (e.g., chlorobenzenes), paraffins (e.g., petroleum fractions), chlorinated aliphatic hydrocarbons (e.g., methylene chloride etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and/or water; as well as dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as nonionic and/or anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other algicides fungicides, herbicides, insecticides, acaricides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of mixture, whereas carrier composition mixtures suitable for direct applications or field application (e.g., water) generally contemplate those in which the active compound is present in an amount substantially between about 0.0001–2.5 percent, by weight of the mixture. Thus, the present invention contemplates overall algicidal compositions which comprise mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent by weight of the mixture.

Furthermore, the present invention contemplates methods of selectively killing, controlling or combating algae or slime bacteria, which comprise applying to at least one of (a) such algae, (b) such slime bacteria or (c) the corresponding habitat, i.e., the locus to be protected (which is normally water), an algicidally or slime bactericidally effective or toxic amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

Preferably, compounds used as algicides or slime bactericides in accordance with the invention are used as such, or if desired, in the form of their water-soluble ammonium salts, such as the corresponding hydrochlorides, sulfates, acetates, benzoates, salicylates, and the like, or in the case of carboxyl alkanoyl substituted compounds they are used as their water-soluble alkali salts. Solutions of these compounds in particular in a lower alcohol, glycol or glycol ether can, of course, also be used. In the case of compounds which still have a free carboxyl group, alkali metal hydroxides (e.g., sodium, potassium) are preferred for the preparation of their water-soluble salts, i.e., in the conventional manner.

It will be realized, of course, that the concentration of the particular active compound utilized in admixture with the carrier vehicle will depend upon the intended application. Therefore, in special cases, it is possible to go above or below the aforementioned concentration ranges.

The outstanding algicidal effectiveness of particular halophenyl-alkyleneamines within the scope of the present invention is illustrated, without limitation, by the following example:

EXAMPLE 1

The inhibition values, for the algicidal effectiveness of the particular active compounds tested, were determined in the following manner:

A common mixed culture of green algae, brown algae, blue algae and diatoms was grown for 2 weeks in neutral nutrient solutions (Allen's nutrient solutions), containing, per liter of water, 1,000 mg. sodium nitrite, 513 mg. Epsom salts, 250 mg. dipotassium hydrogen phosphate, 50 mg. ammonium chloride, 50 mg. calcium chloride and 3 mg. iron (3)–chloride. After the algae had been allowed to grow undisturbed for this period, various amounts of the algicidal compounds of the invention were added correspondingly to the then deep-green colored nutrient solutions.

Algicidally effective substances decolorize such nutrient solutions. The inhibition values stated in Table 1 below are the minimum amounts, in mg./l. (or p.p.m., as the case may be), at which the nutrient solutions were still completely colorless even after 6 weeks' cultivation, i.e., when treated with the instant active compounds:

TABLE 1

| Algicidal compound | Inhibition value in mg./l. (or p.p.m.) |
|---|---|
| ($2_1$) N-(pentachlorophenyl)-ethylenediamine | 5 |
| ($3_1$) N-(2,4,5-trichloro-phenyl)-ethylenediamine | 20 |
| ($4_1$) N-(pentachlorophenyl)-tetramethylenediamine | 2 |
| ($5_1$) N-(pentachlorophenyl)-hexamethylenediamine | 1.5 |
| ($1_1$) N-(2,4,5-trichloro-phenyl)-hexamethylenediamine | 5 |
| ($6_1$) N-(2,5-dichloro-phenyl)-hexamethylenediamine | 5 |
| ($7_1$) N-(pentachlorobenzyl)-hexamethylenediamine | 10 |
| ($8_1$) N-[ω-(pentachlorophenyl-amino)-hexyl]-formamide | 2 |
| ($9_1$) N-[ω-(pentachlorophenyl-amino)-hexyl]-urea | 2 |
| ($10_1$) N-pentachlorophenyl-N'-(chloroacetyl)-hexamethylenediamine | 5 |
| ($11_1$) N-[ω-(pentachlorophenyl-amino)-hexyl]-succinic acid semiamide | 10 |
| ($12_1$) The same inhibition value is achieved with the sodium salt, i.e., N-[ω-(pentachlorophenyl-amino)-hexyl]-succinic acid semiamide sodium salt | |
| ($13_1$) N$^1$-(pentachlorophenyl)-diethylenetriamine | 2 |
| ($14_1$) N$^1$-(2,4,5-trichloro-phenyl)-diethylene-triamine | 3 |
| ($15_1$) N$^1$-(2,4,5-trichloro-phenyl)di-(propylene-1',2')-triamine | 3 |
| ($16_1$) 2-[ω-(pentachlorophenyl-amino)-hexylamino]-imidazoline-1 methosulfate | <1 |
| ($17_1$) N$^1$-(2,5-dichloro-phenyl)-diethylenetriamine | |
| ($19_1$) N$^1$-(2,4,5-trichloro-phenyl)-tri(propylene-1',2')-tetramine | 20 |
| ($20_1$) N-[β(2,4,5-trichlorophenyl-amino)-ethyl]-piperazine | |
| ($21_1$) N-[β-(2,5-dichloro-phenyl-amino)-ethyl]-piperazine | 2 |
| ($22_1$) N-[β-(2,4,6-trichloro-3,5-dimethyl-phenyl-amino)-ethyl]-piperazine | 2.5 |
| ($23_1$) N-(2,4,6-trichloro-3,5-dimethyl-phenyl)-hexamethylendiamine | 1 |
| ($25_1$) N-(2,4,5-trichloro-phenyl)-hexamethylanediamine hydrochloride | 5 |
| ($26_1$) N-(2,4,5-trichloro-phenyl)-tri-ethylene diamine | 20 |

The same inhibition values as given in Table 1 are achieved with equivalent amounts of the corresponding ammonium salts (e.g., salts with hydrohalogen acids such as the corresponding ammonium chlorides, bromides, fluorides and iodides, and with lower aliphatic carboxylic acids such as the corresponding ammonium formates, acetates, propionates, butyrates, etc.).

The practical effectiveness of the compounds of formula (Ia) above can also be seen from the following example:

EXAMPLE 2

In a newly installed industrial closed cooling system (capacity: 3.5 cubic meters of water), the glass condensers and pipes which were accessible to daylight always showed strong growth of algae after a few weeks, so that the cooling effect was appreciably impaired. Without draining off the water, there were then added to the cooling system 100 ml. of a 35 percent solution of N-(pentachlorophenyl)-hexamethylenediamine acetate ($24_1$) in methanol. After about 8 days the algae were dead. The circulation system functioned and cooling was effected without trouble in the time which followed; even after 6 months' operation, living algae could not be isolated from the water of the circulation system. Analogous results are obtainable with the other compounds of formula (Ia) above according to the invention.

EXAMPLE 3

As aforesaid, the compounds of the formula (Ia) above in which Z is a di- or tri-chlorinated phenyl radical, and the group —(NH—A)$_m$ contains up to three nitrogen atoms and up to six carbon atoms, and in which R$^1$ and R$^2$ are hydrogen, or R$^1$ or R$^2$ together with the nitrogen atom form a piperazine ring system, or their water-soluble salts, are new.

These preferred compounds in particular are also very suitable for the control of slime bacteria. Such preferred compounds have proved, for example, outstandingly effective against slime organisms which were isolated from a pulp-conveying channel of a paper factory. The bactericidal effect was tested as follows:

To corresponding Allen's nutrient solutions was added 1 percent caprolactam as a carbon source and an additional nitrogen source for the slime organisms and, after sterilization, a particular active compound of the preferred group of compounds, for example N-(pentachlorophenyl)-hexamethylenediamine ($5_2$) as well as 2-[ω-(pentachlorophenylamino)-hexylamino]-imidazoline-1 methosulfate ($16_2$), in amounts of 0.5–50 mg./l. The nutrient solutions were then infected with a mixed culture of the above-mentioned slime organisms. The nutrient solutions remained completely clear during a three-week culture period, even after reinfection several times, that is the slime formation visible after 3–4 days in nutrient solutions free from the active compound, did not occur in a 3-week period where the particular active compound was present.

The invention is also illustrated, without limitation, by the following further examples.

EXAMPLE 4

41.2 g. 1,2,4-trichloro-benzene (0.23 mol) and 254 g. hexamethylenediamine (2.2 mols) are heated to 200° C. for 23 hours. The bulk of the excess hexamethylenediamine is distilled off in a water-jet vacuum, the remaining residue is treated with a mixture of toluene and about 20 g. of sodium hydroxide in toluene, the toluene phase is washed out with water and, before distillation, drying may be carried out with sodium hydroxide or potassium carbonate. Yield: 52.5 g. of N-(2,5-dichloro-phenyl)-hexamethylenediamine of the formula

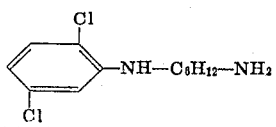

(6$_2$)

b.p. 135°–143° C./0.08 mm. Hg.;

| | |
|---|---|
| Calculated: | N 10.72% |
| Found: | 10.5–10.7% |

In the same manner, there are obtained:

From 1,2,4-trichloro-benzene and N-(β-amino-ethyl)-piperazine, the compound N-[β-(2,5-dichloro-phenyl-amino)-ethyl]-piperazine of the formula

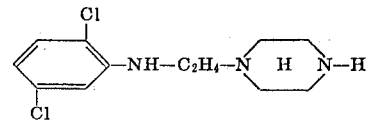

(21$_2$)

b.p. 136° C./0.04 mm. Hg;

| | |
|---|---|
| Calculated: | Cl 25.85% |
| Found: | 25.4% |

From 1,2,4-trichloro-benzene and technical-grade di(propylene-1,2)-triamine, the compound N$^1$-(2,5-dichlorophenyl)-di(propylene-1',2')-triamine of the formula

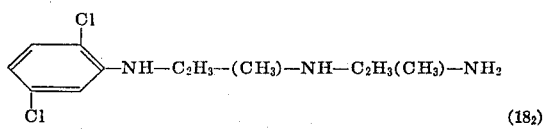

(18$_2$)

b.p. 123°–131° C./0.06 mm. Hg;

| | | |
|---|---|---|
| Calculated: | N 15.22% | Cl 25.65% |
| Found: | 14.9% | 25.4–25.5% |

From 1,2,4-trichloro-benzene and technical-grade diethylenetriamine, the compound N$^1$-(2,5-dichloro-phenyl)-diethylenetriamine of the formula

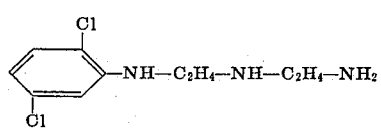

(17$_2$)

b.p. 130°–138° C./0.05 mm. Hg;

| | | |
|---|---|---|
| Calculated: | N 16.93% | Cl 28.55% |
| Found: | 16.0% | 27.6% |

EXAMPLE 5

431.8 g. 1,2,4,5-tetrachloro-benzene (2 mols) and 2,320 g. hexamethylenediamine (20 mols) are kept at 200° C. for 7 hours and then worked up as described in Example 4 above. Yield: 496 g. of N-(2,4,5-trichloro-phenyl)-hexamethylenediamine of the formula

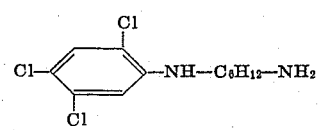

(1$_3$)

b.p. 153° C./0.06 mm. Hg;

Hydrochloride (from ethylene chloride) m.p. 124° C., i.e., N-(2,4,5-trichloro-phenyl)-hexamethylenediamine hydrochloride (25$_1$)

| | |
|---|---|
| Calculated: | N 9.49% |
| Found: | 9.3–9.4% |

In the same manner, there are obtained:

From 1,2,4,5-tetrachloro-benzene and N-(β-amino-ethyl)-piperazine, the compound N-[β-(2,4,5-trichloro-phenyl)-amino)-ethyl]-piperazine of the formula

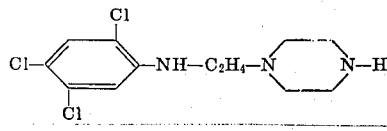
(20₂)

b.p. 141°–145° C./0.02 mm. Hg;

| Calculated: | N 13.63% |
| --- | --- |
| Found: | 13.4% |

From 1,2,4,5-tetrachloro-benzene and technical-grade diethylenetriamine, the compound N¹-(2,4,5-trichloro-phenyl)-diethylenetriamine of the formula

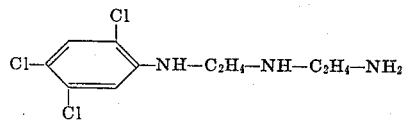
(14₂)

b.p. 148°–153° C./0.07 mm. Hg;

| Calculated: | N 14.88% | Cl 37.6% |
| --- | --- | --- |
| Found: | 14.1% | 36.5% |

From 1,2,4,5-tetrachloro-benzene and technical-grade di(propylene-1,2)-triamine, the compound N¹-(2,4,5-trichloro-phenyl)-di(propylene-1',2')-triamine of the formula

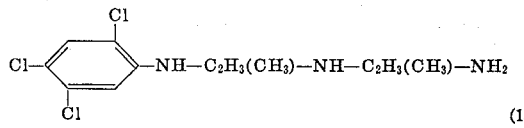
(15₂)

b.p. 136°–146° C./0.04 mm. Hg;

| Calculated: | N 13.5% | Cl 34.18% |
| --- | --- | --- |
| Found: | 13.8% | 34.5% |

From 1,2,4,5-tetrachloro-benzene and technical-grade triethylenetetramine, the compound N¹-(2,4,5-trichloro-phenyl)-triethylenetetramine of the formula

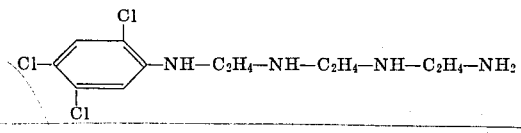
(26₂)

b.p. 163°–171° C./0.04 mm. Hg;

From 1,2,4,5-tetrachloro-benzene and technical-grade tri(propylene-1,2)-tetramine, the compound N¹-(2,4,5-trichloro-phenyl)-tri(propylene-1',2')-tetramine of the formula

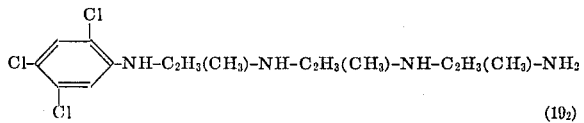
(10₂)

b.p. 163° C./0.03 mm. Hg;

| Calculated: | N 15.27% | Cl 28.95% |
| --- | --- | --- |
| Found: | 15.1% | 29.3% |

EXAMPLE 6

1,2,4,5-tetrachloro-benzene is left at boiling temperature (about 110°–120° C.) for 40 hours with approximately 10 mols of ethylenediamine in similar manner to the procedure of Example 4. The working up gives N-(2,4,5-trichloro-phenyl)-ethylenediamine of the formula

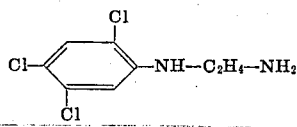
(3₂)

b.p. 121° C./0.02 mm. Hg;

| Calculated: | N 11.7% |
| --- | --- |
| Found: | 11.4–11.6% |

EXAMPLE 7

401 g. N-(pentachlorophenyl)-hexamethylenediamine hydrochloride (27₁) (1 mol) and 120 g. urea (2 mols) are kept at 100° C. for 6 hours in 2 liters of water, with vigorous stirring. After about an hour, two phases are formed. The organic phase crystallizes after standing for a time at room temperature at the end of the 6-hour period. The crystalline product is separated, washed well with water and, after drying, recrystallized from ethylene chloride. Yield: 330 g. of N-pentachlorophenyl-N'-(amino-carbonyl)-hexamethylenediamine, i.e., N-[ω-(pentachloro-phenyl-amino)-hexyl]-urea, of the formula

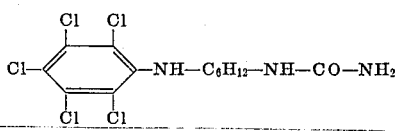
(9₂)

| Calculated: | N 10.33% |
| --- | --- |
| Found: | 10.2–10.4% |

EXAMPLE 8

To a solution of 91 g. N-(pentachlorophenyl)-hexamethylenediamine (5₃) (0.25 mol) in 350 ml. methanol there are added 25 g. succinic anhydride (0.25 mol), and the mixture is kept at 50° C. for 1 hour to produce N-[ω-(pentachlorophenyl-amino)-hexyl]-succinic acid semi-amide (11₂).

For salt formation, 13.5 g. sodium methylate are introduced into the reaction mixture, and the salt is precipitated by addition of 1.2 liters acetone. Yield: 64 g. of N-[ω-(pentachlorophenyl-amino)-hexyl]-succinic acid semiamide sodium salt of the formula

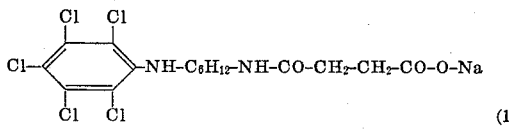
(12₂)

| Calculated: | N 5.76% | Na 4.73% |
| --- | --- | --- |
| Found: | 5.85% | 5.0% |

EXAMPLE 9

159 g. tetrachloro-m-xylene (0.65 mol) and 850 g. N-(β-amino-ethyl)3piperazine (6.6 mols) are heated to 200° C. for 24 hours. The bulk of the excess N-(β-amino-ethyl)-piperazine is distilled off in a water-jet vacuum. The residue is treated with water which contains 30 g. sodium hydroxide and with toluene, and the toluene phase is separated and distilled. Yield: 159 g. of N-[β-(2,4,6-trichloro-3,5-dimethyl-phenyl-amino)-ethyl]-piperazine of the formula

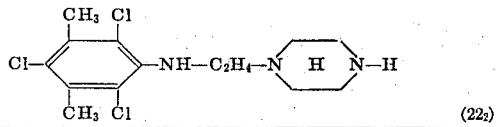
(22$_2$)

of boiling point 164° C./0.09 mm. Hg;

| | | |
|---|---|---|
| Calculated: | Cl 31.60% | N 12.48% |
| Found: | 31.6% | 12.5% |

EXAMPLE 10

By reaction of tetrachloro-m-xylene with hexamethylenediamine in a similar manner to that of Example 9, there is obtained N-(2,4,6-trichloro-3,5-dimethyl-phenyl)-hexamethylenediamine of the formula

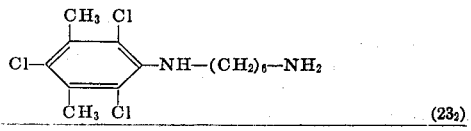
(23$_2$)

of boiling point 150°–152° C./0.08 mm. Hg;

| | |
|---|---|
| Calculated: | Cl 32.9% |
| Found: | 32.6% |

| | |
|---|---|
| N-(pentachlorophenyl)-ethylenediamine | (2$_2$) |
| N-(pentachlorophenyl)-tetramethylenediamine | (4$_2$) |
| N-(pentachlorophenyl-hexamethylenediamine | (5$_2$) |
| N-(pentachlorobenzyl)-hexamethylenediamine | (7$_2$) |
| N-[ω-(pentachlorophenyl-amino)-hexyl]-formamide | (8$_2$) |
| N-pentachlorophenyl-N'-(chloroacetyl)-hexamethylenediamine | (10$_2$) |
| N$^1$-(pentachlorophenyl)-diethylenetriamine | (13$_2$) |
| 2-[ω-(pentachlorophenyl-amino)-hexylamino]-imidazoline-1 methosulfate | (16$_2$) |
| N-(pentachlorophenyl)-hexamethylenediamine acetate | (24$_2$) | and

| | |
|---|---|
| N-(pentachloro-phenyl)-hexamethylenediamine hydrochloride | (27$_2$) | are prepared in an analogous manner.

It will be realized by the artisan that all of the foregoing compounds, including the corresponding water soluble salts, contemplated by the present invention possess the desired strong algicidal and slime bactericidal properties, with regard to a broad spectrum of activity, as well as a comparatively low toxicity toward warm-blooded creatures, enabling such compounds to be used with correspondingly favorable compatibility with warmblooded creatures for more effective control and/or elimination of algae and slime bacteria by application of such compounds to such algae and/or slime bacteria and/or their habitat.

It will be appreciated that the instant specification and examples are set forth by way of illustration and not limitation, and that various modifications and changes may be made without departing from the spirit and scope of the present invention.

What is claimed is:
1. Method of killing algae and slime bacteria, which comprises applying to at least one of (a) such algae, (b) such slime bacteria and (c) the corresponding habitat, a toxic amount of a compound selected from the group consisting of an N-chlorophenyl-alkylene polyamine of the formula

$$Z-(NH-A)_m-N\begin{matrix}R_1\\R_2\end{matrix}$$

in which m is a whole number from 1–4, A is alkylene having 2–10 carbon atoms, R$^1$ is hydrogen, R$^2$ is selected from the group consisting of hydrogen, —CHO, —CONH$_2$, lower alkanoyl, chloro lower alkanoyl, carboxyl-lower alkanoyl, and alkali metal carboxyl salt-lower alkanoyl, formamidino, and lower alkyl substituted formamidino, and Z is a phenyl radical of the formula

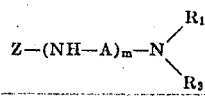
(X)$_n$ in which X is selected from the group consisting of hydrogen, chloro and lower alkyl, and n is a whole number from 2–5, at least two of the X substituents being chloro; and the corresponding water-soluble salt of said polyamine.

2. Method according to claim 1 wherein such compound is N-[ω(pentachlorophenyl)]-diethylene triamine.

3. Method according to claim 1 wherein such compound is N-(2,4,6-trichloro-3,5-dimethyl-phenyl)-hexamethylenediamine.

4. Method according to claim 1 wherein such compound is N-(pentachlorophenyl)-hexamethylenediamine acetate.

5. Method according to claim 1 wherein such compound is used in the form of a mixture with an inert dispersible carrier vehicle, said compound being present in a toxic amount and constituting substantially between about 0.0001–2.5 percent by weight of the mixture.

6. Method according to claim 1 wherein m is a whole number from 1–3, A is C$_{2-6}$ alkylene, R$^1$ is hydrogen, R$^2$ is selected from the group consisting of hydrogen, —CHO, —CONH$_2$, C$_{\text{o-4}}$ alkanoyl, chloro- C$_{2-4}$ alkanoyl, carboxyl-C$_{2-4}$ alkanoyl, formamidino, and C$_{1-4}$ alkyl substituted formamidino, Z is a phenyl radical of the formula

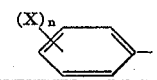
(X)$_n$ in which X is selected from the group consisting of hydrogen, chloro and C$_{1-4}$ alkyl, and n is a whole number from 2–5, at least two of the X substituents being chloro, and the corresponding water-soluble salts are selected form the group consisting of hydrogen halide, hydrogen sulfate, lower alkyl sulfate, lower alkanoate, benzoate and salicylate ammonium salts.

7. Method according to claim 1 wherein m is a whole number from 1–3, the group —(NH—A)$_m$ contains up to three N-atoms and up to six carbon atoms, R$^1$ is hydrogen, R$^2$ is hydrogen, and Z is a phenyl radical of the formula

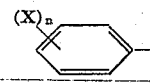
(X)$_n$ in which X is selected from the group consisting of hydrogen, chloro and C$_{1-4}$ alkyl, and n is a whole number, at least two of the X substituents being chloro, and the corresponding water-soluble salts are selected from the group consisting of hydrogen halide, hydrogen sulfate, lower alkyl sulfate, lower alkanoate, benzoate and salicylate ammonium salts.

8. Method according to claim 1 wherein $m$ is 1-3 the group $-(NH-A)_m$ contains 1-3 N-atoms and 2-6 carbon atoms, $R^1$ is hydrogen, $R^2$ is hydrogen, and Z is selected from the group consisting of dichlorophenyl and trichlorophenyl.

9. Method according to claim 1 wherein such compound is selected from the group consisting of
N-(pentachlorophenyl)-hexamethylenediamine,
N-[ω(pentachlorophenyl)]-diethylene-triamine,
N-(2,4,6-trichloro-3,5-dimethyl-phenyl)-hexamethylene-diamine, and
N-(pentachlorophenyl)-hexamethylenediamine acetate.

10. Method according to claim 1 wherein such compound is applied to an algae habitat.

11. Method according to claim 1 wherein such compound is applied to a slime bacteria habitat.

* * * * *

CERTIFICATE OF CORRECTION

Patent No. 3,645,715      Dated February 29, 1972

Inventor(s) Werner Daum, et al.

It is certified that error appears in the above-identified patent and that said Letters Patent are hereby corrected as shown below:

Col. 1, line 47

Delete "5"

Col. 3, line 30

"$C.._2$" should be --$C_{1-2}$--

Col. 6, line 56

Last column, insert --20--

At line 57 insert:

--($18_1$) $N^1$-2,5-dichloro-phenyl)-di(propylene-1',2')-triamine 40--

Col. 6, lines 59/61 should read:

tetramine                                            20

($20_1$) N-[β-(2,4,5-trichloro-phenyl-amino)- ethyl]-piperazine                               1

Signed and sealed this 27th day of June 1972.

(SEAL)
Attest:

EDWARD M. FLETCHER, JR.          ROBERT GOTTSCHALK
Attesting Officer                  Commissioner of Patents